(12) United States Patent
Tari et al.

(10) Patent No.: US 10,352,771 B2
(45) Date of Patent: Jul. 16, 2019

(54) INFRARED SENSOR AND INFRARED SENSOR DEVICE

(71) Applicant: MITSUBISHI MATERIALS CORPORATION, Tokyo (JP)

(72) Inventors: Kazuyoshi Tari, Naka (JP); Mototaka Ishikawa, Naka (JP); Keiji Shirata, Naka (JP); Kenzo Nakamura, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 449 days.

(21) Appl. No.: 14/376,343

(22) PCT Filed: Feb. 1, 2013

(86) PCT No.: PCT/JP2013/000580
§ 371 (c)(1),
(2) Date: Aug. 1, 2014

(87) PCT Pub. No.: WO2013/118481
PCT Pub. Date: Aug. 15, 2013

(65) Prior Publication Data
US 2015/0043614 A1    Feb. 12, 2015

(30) Foreign Application Priority Data
Feb. 6, 2012    (JP) ................. 2012-022896

(51) Int. Cl.
  *G01J 5/14*    (2006.01)
  *G01J 5/10*    (2006.01)
  (Continued)

(52) U.S. Cl.
  CPC . *G01J 5/14* (2013.01); *G01J 5/04* (2013.01); *G01J 5/0803* (2013.01); *G01J 5/10* (2013.01)

(58) Field of Classification Search
  CPC .... G01J 5/14; G01J 5/0803; G01J 5/04; G01J 5/10
  See application file for complete search history.

(56) References Cited

U.S. PATENT DOCUMENTS 3,054,977 A * 9/1962 Baasch .................... H01C 7/04
                                                    338/15
5,693,942 A * 12/1997 Endo ........................ G01J 5/20
                                                    250/338.1

(Continued)

FOREIGN PATENT DOCUMENTS

JP    61-44534 U    3/1986
JP    H045526 A    1/1992

(Continued)

OTHER PUBLICATIONS

Japan Electronics and Information Technology Industries Association, EIAJ EDR-7330 (Jun. 2002), 36 pages.*

(Continued)

*Primary Examiner* — David P Porta
*Assistant Examiner* — Shun Lee
(74) *Attorney, Agent, or Firm* — Locke Lord LLP

(57) ABSTRACT

Provided are an infrared sensor and an infrared sensor device that are less susceptible to effects from the casing and lead wires, can be surface-mounted, and can measure the temperature of the object to be measured in a more accurate manner. This invention has: an insulating film; a first and a second heat sensitive element provided on the insulating film; a first and a second wiring film that are respectively connected to the heat sensitive elements; an infrared reflecting film; a terminal support body, arranged on the one face; and a plurality of mounting terminals provided to the terminal support body, wherein the mounting terminals have support convex parts protruding upward, the support convex parts are connected to the corresponding first and second (Continued)

wiring films, and the insulating film is supported such that a gap is provided between the terminal support body and the insulating film.

9 Claims, 4 Drawing Sheets

(51) Int. Cl.
    *G01J 5/04*     (2006.01)
    *G01J 5/08*     (2006.01)

(56) References Cited

U.S. PATENT DOCUMENTS

| | | | |
|---|---|---|---|
| 5,962,854 A * | 10/1999 | Endo | G01J 5/02 |
| | | | 250/338.1 |
| 6,359,276 B1 | 3/2002 | Tu | |
| 2002/0043706 A1 * | 4/2002 | Jerominek | B81B 7/0077 |
| | | | 257/680 |
| 2003/0123517 A1 | 7/2003 | Nojiri | |
| 2009/0050808 A1 | 2/2009 | Ushimi et al. | |
| 2012/0269228 A1 * | 10/2012 | Nakamura | G01J 1/04 |
| | | | 374/130 |

FOREIGN PATENT DOCUMENTS

| | | |
|---|---|---|
| JP | H07240595 A | 9/1995 |
| JP | 09-148482 A | 6/1997 |
| JP | 2001-066185 A | 3/2001 |
| JP | 2002156284 A | 5/2002 |
| JP | 2003-194630 A | 7/2003 |
| JP | 2006-118992 A | 5/2006 |
| JP | 2011-013213 A | 1/2011 |
| JP | 2011-102791 A | 5/2011 |
| TW | 201023352 A | 6/2010 |
| WO | 2007129547 A1 | 11/2007 |
| WO | WO-2011046163 A1 | 4/2011 |

OTHER PUBLICATIONS

Japanese Office Action for Japanese Application No. 2012-022896 dated Aug. 25, 2015.
Extended European Search Report for EP Appln. No. 13746734.6 dated Sep. 1, 2015.
Office Action dated Jan. 26, 2016, issued for the Taiwanese Patent Application No. 102103483 and Japanese/English translation thereof.
Decision of Dismissal of Amendment dated Aug. 9, 2016, issued for Japanese patent application No. 2012-022896 and English translation thereof.
International Search Report for PCT/JP2013/000580 dated May 14, 2013.
Office Action dated Jan. 28, 2016, issued for the corresponding Japanese patent application No. 2012-022896 and English translation thereof.
Office Action dated Sep. 19, 2017 issued for corresponding Japanese Patent Application No. 2016-230926.

\* cited by examiner

INFRARED SENSOR AND INFRARED SENSOR DEVICE

CROSS-REFERENCE TO RELATED APPLICATIONS

This application is a U.S. National stage application of PCT International Application No. PCT/JP2013/000580, filed Feb. 1, 2013, which claims the benefit of Japanese Patent Application No. 2012-022896 filed Feb. 6, 2012, the entire contents of the aforementioned applications are hereby incorporated herein by reference.

BACKGROUND OF THE INVENTION

Field of the Invention

The present invention relates to an infrared sensor and an infrared sensor device that detect infrared radiation from an object to be measured to thereby measure the temperature of the object to be measured.

Description of the Related Art

Conventionally, infrared sensors have been used as temperature sensors that detect infrared radiation due to the radiation emitted from an object to be measured without contact to thereby measure the temperature of the object to be measured.

For example, Patent Document 1 discloses an infrared temperature sensor that includes a resin film that is disposed on a holder, a heat sensitive element for infrared detection that is provided on the resin film and detects infrared radiation via a light guide unit of the holder, and a heat sensitive element for temperature compensation that is provided on the resin film in a light-shielding state and detects the temperature of the holder. In the infrared temperature sensor, the resin film is disposed on the holder formed of aluminum. In the infrared temperature sensor, lead wires are connected to the end of the resin film.

In addition, Patent Document 2 discloses a non contact temperature sensor that includes a first casing through which an infrared radiation entrance aperture is formed; a second casing having an entrance aperture facing surface portion opposing to the entrance aperture; a base plate that is arranged between the first casing and the entrance aperture facing surface portion provided in the second casing, is attached to the first casing side of the entrance aperture facing surface portion, and performs thermal conversion of infrared radiation incident from the entrance aperture; and a first heat sensitive element that is provided on the base plate and is sensitive to the amount of heat transferred by infrared radiation. In the non-contact temperature sensor, the heat sensitive element is provided on the resin film, and the resin film is supported by the bottom plate part of the case formed of aluminum. In the non-contact temperature sensor, lead wires are connected to the end of the resin film.

PRIOR ART DOCUMENTS

Patent Documents

[Patent Document 1] Japanese Unexamined. Patent Application Publication No. 2002-156284 (Paragraph [0026], FIG. 2)

[Patent Document 2] Japanese Unexamined Patent Application Publication No. 2006-118992 (Claims, FIG. 1)

SUMMARY OF THE INVENTION

Problems to be Solved by the Invention

However, the following problems still remain in the conventional techniques described above.

Specifically, in the conventionally infrared sensor, the resin film on which the heat sensitive elements are provided is installed in a metal casing such as a case or a holder made of aluminum, the neat sensitive elements are adversely affected by heat conduction from the metal casing for supporting the resin film.

Since lead wires are connected to the end of the resin film, heat is dissipated from the end side via the lead wires, so that the heat sensitive elements are adversely affected thereby, resulting in a lost in thermal balance between a pair of heat sensitive elements. Thus, it is difficult to detect a temperature with accuracy using the heat sensitive elements.

Furthermore, any of these sensors is electrically connected to the outside via lead wires, so that any of these sensors cannot be directly connected to the wirings on a substrate by being surface-mounted on a circuit substrate or the like.

A part of incident infrared radiation transmits through the resin film and then is absorbed by the casing on the rear face, so that the heat sensitive elements are adversely affected due to the change in temperature of the casing.

The present invention has been made in view of the aforementioned circumstances, and an object of the present invention is to provide an infrared sensor and an infrared sensor device that are less susceptible to effects from the casing, lead wires, and other elements, can be surface-mounted, and can measure the temperature of an object to be measured in a more accurate manner.

Means for Solving the Problems

The present invention adopts the following structure in order to solve the aforementioned problems. Specifically, an infrared sensor according to a first aspect of the present invention is characterized in that the infrared sensor includes an insulating film; a first heat sensitive element and a second heat sensitive element provided on one face of the insulating film so as to be spaced apart from one another; a first conductive wiring film and a second conductive wiring film that are formed on one surface of the insulating film and are respectively connected to the first heat sensitive element and the second heat sensitive element; an infrared reflecting film provided on the other face of the insulating film so as to face the second heat sensitive element; a terminal support body, made of a resin, arranged on the one face; and a plurality of mounting terminals provided to the terminal support body with the lower portions of the mounting terminals disposed on the lower portion of the terminal support body, wherein the mounting terminals have support convex parts protruding upward with the support convex parts extended up to the top of the terminal support body, the support convex parts are connected to the corresponding first and second wiring films, and the insulating film is supported such that a gap is provided between the terminal support body and the insulating film.

Since, in the infrared sensor, the support convex parts of the mounting terminals are connected to the corresponding first and second wiring films and the insulating film is supported such that a gap is provided between the terminal support body and the insulating film, the insulating film is supported by a plurality of mounting terminals instead of the metal casing in the state floating from the mounting substrate and the terminal support body. The terminal support body made of a resin functions as an insulator that supports a plurality of mounting terminals and lifts the insulating film up in the air apart from the mounting substrate. As described above, only the support convex parts of the mounting terminals are brought into contact with the insulating film, and the mounting terminals have an electrical connecting function and an insulating film supporting function, so that the infrared sensor can be surface-mounted and the adverse effect of heat conduction from portions for fixing the insulating film can be reduced as small as possible. Since the terminal support body is not directly brought into contact with the insulating film and is made of a resin, the influence from the terminal support body can be extremely minimized as compared with that of the conventional metal casing. Furthermore, electrical connection to the wirings on the mounting substrate can be directly made by the mounting terminals by surface mounting and the lead wires are not brought into contact with the insulating film, so that heat dissipation and thermal imbalance caused by the lead wires can be prevented.

An infrared sensor according to a second aspect of the present invention is characterized in that the lower portions of the mounting terminals are provided so as to protrude below the bottom face of the terminal support body according to the first aspect of the present invention.

Specifically, since, in the infrared sensor, the lower portions of the mounting terminals are provided so as to protrude below the bottom face of the terminal support body, the mounting substrate is not directly brought into contact with the terminal support body because of a space formed therebetween in the state where the mounting terminals are surface-mounted on the mounting substrate, so that the influence of heat conduction from the mounting substrate can also be suppressed. Thus, the insulating film on which the heat sensitive elements are provided is floated in two stages: a space formed between the insulating film and the terminal support body and the other space formed between the terminal support body and the mounting substrate, resulting in an improvement in thermal insulation at the rear face (one face) thereof.

An infrared sensor according to a third aspect of the present invention is characterized in that the terminal support body is formed in a frame shape along at least the outer edge of the insulating film according to the first or the second aspect of the present invention.

Specifically, since, in the infrared sensor, the terminal support body is formed in a frame shape along at least the outer edge of the insulating film, a major part of incident infrared radiation passes through the interior of the frame of the terminal support body and thus is not absorbed by the terminal support body even if a part of incident infrared radiation transmits through the insulating film, so that the change in temperature of the terminal support body due to infrared radiation may be prevented.

An infrared sensor according to a fourth aspect of the present invention is characterized in that the first wiring film is disposed around the first heat sensitive element and is formed to have a larger area than that of the second wiring film according to any one of the first to third aspects of the present invention.

Specifically, since, in the infrared sensor, the first wiring film is disposed around the first heat sensitive element and is formed to have a larger area than that of the second wiring film, the first wiring film having a large area blocks infrared radiation which is irradiated on the terminal support body and the mounting substrate by passing through the insulating film and also blocks radiation heat radiated from the terminal support body and the mounting substrate, so that the insulating film may be prevented from being thermally affected. Furthermore, the first wiring film improves heat collection from a portion of the insulating film at which infrared radiation has been absorbed, and a heat capacity of the first wiring film becomes close to that of a portion in which the infrared reflecting film is formed on the insulating film, resulting in a reduction in variation error. Thus, the infrared sensor sensitively reacts to ambient temperature fluctuation, and thus, exhibits excellent followability between a portion affected by radiation heat and a portion unaffected by radiation heat, resulting in a further improvement in detection accuracy. It is preferable that the area and the shape of the first wiring film are set such that the heat capacity of the first wiring film is substantially the same as that of a portion in which the infrared reflecting film is formed on the insulating film.

An infrared sensor device according to a fifth aspect of the present invention is characterized in that the infrared sensor device includes a mounting substrate having a plurality of substrate-side wirings patterned on the surface thereof and the infrared sensor according to any one of the first to fourth aspects of the present invention that is mounted on the surface of the mounting substrate and to which the corresponding mounting terminals and substrate-side wirings are connected.

Specifically, since, in the infrared sensor device, the infrared sensor according to any one of the first to fourth aspects of the present invention is mounted on the surface of the mounting substrate, the surface-mounted infrared sensor can be integrally attached to the mounting substrate.

An infrared sensor device according to a sixth aspect of the present invention is characterized in that a metal foil is formed on the substantially entire back face of the mounting substrate according to the fifth aspect of the present invention.

Specifically, since, in the infrared sensor device, a metal foil is formed on the substantially entire back face of the mounting substrate, heat is dissipated by the metal foil even if heat is locally applied to the back face of the mounting substrate. Consequently, heat is uniformly transferred to both the first heat sensitive element side (heat-absorbing side) and the second heat sensitive element side (heat-reflecting side). Thus, the temperature distribution on the mounting substrate due to local heat is less likely to occur, so that only the temperature distribution due to radiation heat remains on the mounting substrate. Consequently, measurement error caused by the temperature distribution due to other than radiation heat can be suppressed.

An infrared sensor device according to a seventh aspect of the present invention, is characterized in that the substrate-side wirings have a pair of first substrate-side wirings connected to the pair of first wiring films and a pair of second substrate-side wirings connected to the pair of second wiring films, the pair of first substrate-side wirings and the pair of second substrate-side wirings are set to have the same line width and thickness as each other, and the total length of the pair of first substrate-side wirings is set to be the same as that of the pair of second substrate-side wirings according to the fifth or the sixth aspect of the present invention.

Specifically, since, in the infrared sensor device, the pair of first substrate-side wirings and the pair of second substrate-side wirings are set to have the same line width and thickness as each other, and the total length of the pair of first substrate-side wirings is set to be the same as that of the pair of second substrate-side wirings, heat is uniformly dissipated from the substrate-side wirings, so that only the temperature distribution due to radiation heat remains on the surface. Thus, thermal imbalance caused by the substrate-side wirings is suppressed, and heat is uniformly transferred to both the first heat sensitive element side (heat-absorbing side) and the second heat sensitive element side (heat-reflecting side), resulting in highly accurate temperature measurement.

An infrared sensor device according to an eighth aspect of the present invention is characterized in that the infrared sensor device includes a cylindrical optical guide path member that is disposed on the surface of the mounting substrate so as to surround the infrared sensor with the cylindrical optical guide path member opened immediately above the infrared sensor according to any one of the fifth to seventh aspects of the present invention.

Specifically, since the infrared sensor device includes a cylindrical optical guide path member that is disposed on the surface of the mounting substrate so as to surround the infrared sensor with the cylindrical optical guide path member opened immediately above the infrared sensor, the optical guide path member may not only serve as a windshield for the surface-mounted infrared sensor but also serve to provide the directionality of received light.

Effects of the Invention

According to the present invention, the following effects may be provided.

Specifically, according to the infrared sensor and the infrared sensor device of the present invention, the support convex parts of the mounting terminals are connected to the corresponding first and second wiring films and the insulating film is supported such that a gap is provided between the terminal support body and the insulating film, so that the adverse effect of heat conduction from portions for fixing the insulating film can be reduced as small as possible. Furthermore, electrical connection to the wirings on the mounting substrate can be directly made by the mounting terminals by surface mounting and thermal imbalance caused by the lead wires can be eliminated.

Thus, the infrared sensor can not only achieve a highly-accurate temperature measurement but also can be readily surface-mounted as an SMD-type infrared sensor. Consequently, the infrared sensor can also be automatically mounted on a glass epoxy substrate or the like, resulting in high mass productivity.

BRIEF DESCRIPTION OF THE DRAWINGS

FIG. 1(*b*) is a front view illustrating an infrared sensor according to one embodiment of the infrared sensor and the infrared sensor device of the present invention.

FIG. 1(*c*) is a bottom view illustrating an infrared sensor according to one embodiment of the infrared sensor and the infrared sensor device of the present invention.

FIG. 1(*d*) is a side view illustrating an infrared sensor according to one embodiment of the infrared sensor and the infrared sensor device of the present invention.

FIG. 4(*b*) is a bottom view illustrating a terminal support body according to the present embodiment.

FIG. 4(*c*) is a side view illustrating a terminal support body according to the present embodiment.

FIG. 4(*d*) is a cross-sectional view illustrating a terminal support body cut along a portion of mounting terminals.

BEST MODES FOR CARRYING OUT THE INVENTION

Figure 1:
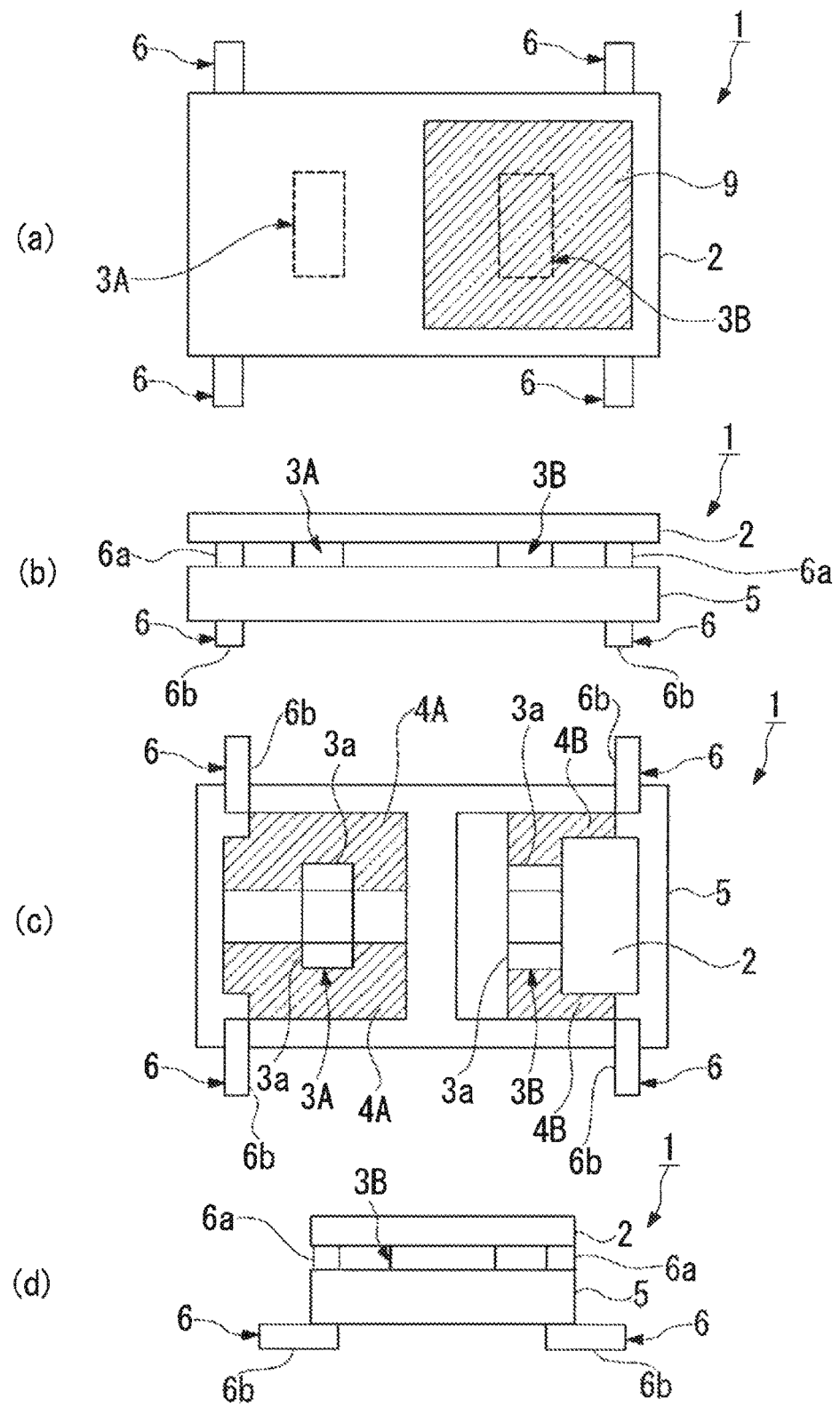
FIG. 1(*a*) is a plan view illustrating an infrared sensor according to one embodiment of the infrared sensor and the infrared sensor device of the present invention.

Hereinafter, a description will be given of an infrared sensor and an infrared sensor device according to one embodiment of the present invention with reference to FIGS. 1 to 6. In the drawings used in the following description, the scale of each component is changed as appropriate so that each component is recognizable or is readily recognized.

Figure 2:
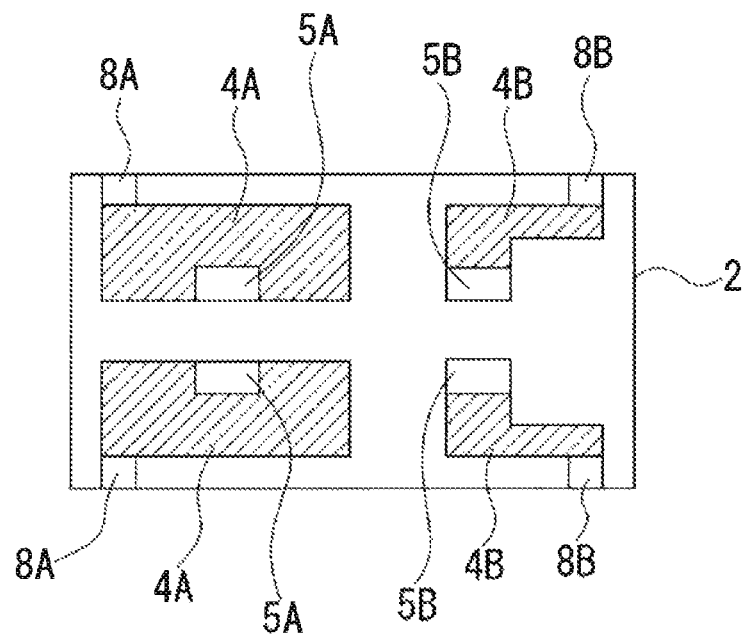
FIG. 2 is a bottom view illustrating an insulating film according to the present embodiment.
Figure 3:
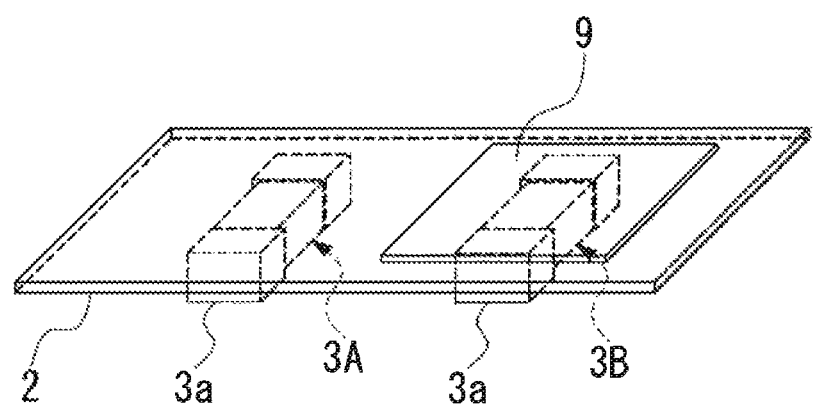
FIG. 3 is a perspective view simply illustrating an insulating film with a heat sensitive element adhered thereto according to the present embodiment.

As shown in FIGS. 1 to 3, an infrared sensor (1) of the present embodiment includes an insulating film (2); a first heat sensitive element (3A) and a second heat sensitive element (3B) provided on one face (bottom face or rear face) of the insulating film (2) so as to be spaced apart from one another; a first conductive wiring film (4A) connected to a first heat sensitive element (3A) and a second conductive wiring film (4B) connected to a second heat sensitive element (3B), the first and second conductive wiring films being formed on one face of the insulating film (2); an infrared reflecting film (9) provided on the other face of the insulating film (2) so as to face the second heat sensitive element (3B); a terminal support body (5), made of a resin, arranged on the one face; and a plurality of mounting terminals (6) provided to the terminal support body (5) with the lower portions of the mounting terminals (6) disposed on the lower portion of the terminal support body (5).

The mounting terminals (6) are formed of, for example, a tin-plated copper alloy. The mounting terminals (6) have the support convex parts (6a) protruding upward with the support convex parts (6a) extended up to the top of the terminal support body (5), the support convex parts (6a) are connected to the corresponding first wiring film (4A) and second wiring film (4B), and the insulating film (2) is supported such that a gap is provided between the terminal support body and the insulating film (2).

The lower portion (6b) of each of the mounting terminals (6) is provided so as to protrude below the bottom face of the terminal support body (5). Specifically, each of the mounting terminals (6) extends downward from the upper support convex part (6a) thereof, the lower portion (6b) of the mounting terminal (6) protrudes below the bottom face of the terminal support body (5), and the lower portion (6b) is further bent sideways, so that the mounting terminal (6) is formed into an L shape as a whole.

The mounting terminals (6) are arranged at the four corners of the terminal support body (5), and are built into the terminal support body (5) by insert molding, fitting, or the like.

Figure 4:
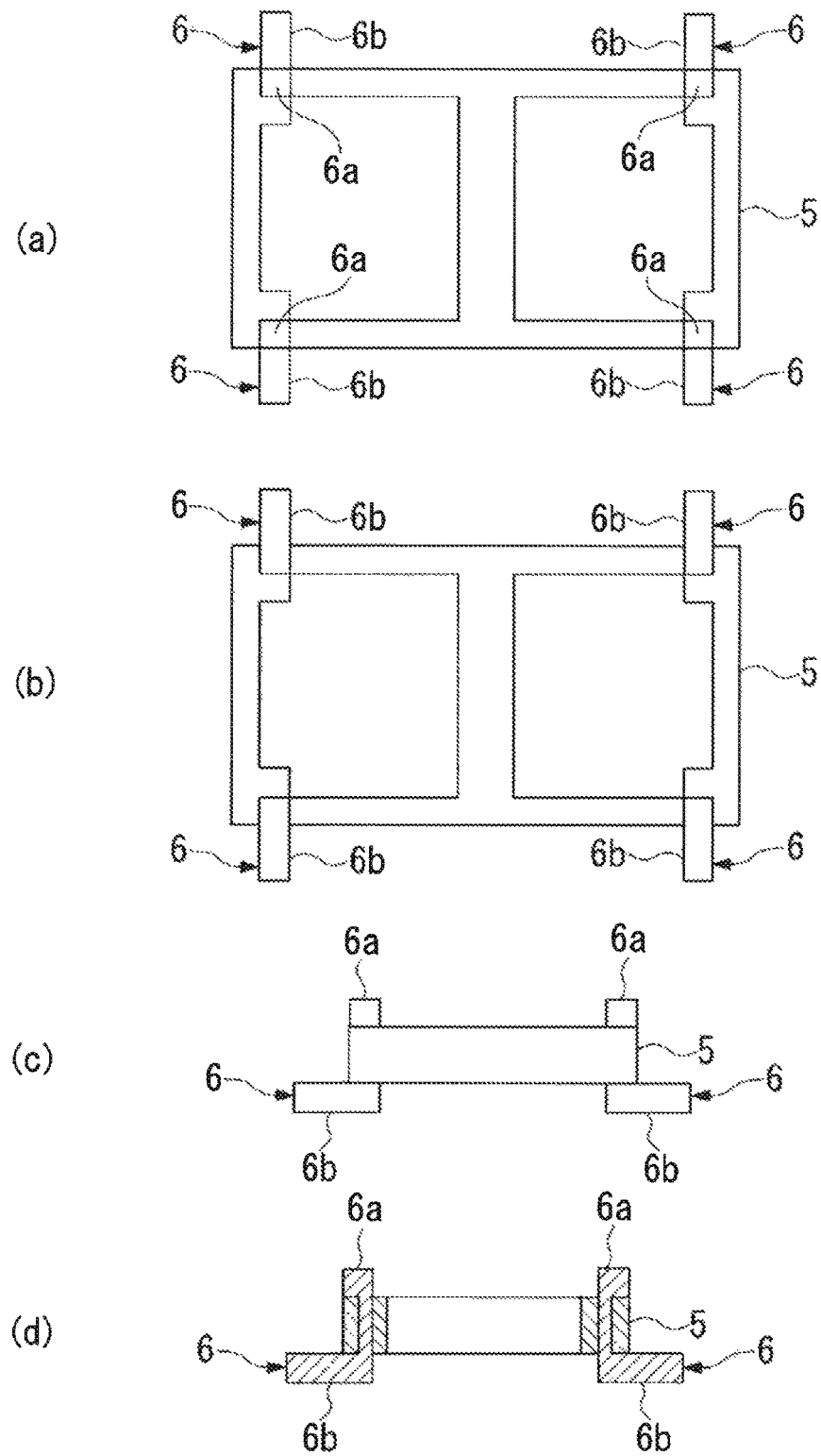
FIG. 4(*a*) is a plan view illustrating a terminal support body according to the present embodiment.

The terminal support body (5) is formed of a such as a PPS (polyphenylene sulfide resin) or the like, and is formed in a frame shape along at least the outer edge of the insulating film (2) as shown in FIG. 1 and FIG. 4. Specifically, the terminal support body (5) is constituted by an outer frame portion along the outer edge of the insulating film (2) and an intermediate frame portion across the intermediate portion between the first heat sensitive element (3A) and the second heat sensitive element (3B).

As shown in FIG. 1 and FIG. 2, the first wiring films (4A) are disposed around the first heat sensitive element (3A) and are formed to have a larger area than that of the second wiring films (4B). These first wiring films (4A) have the first heat sensitive element (3A) that is arranged substantially at the center of the pair of the first wiring films (4A) and are set to have substantially the same square outer shape as that of the infrared reflecting film (9). Specifically, the area and the shape of the first wiring films (4A) are set such that the first wiring films (4A) have substantially the same heat capacity as that of a portion in which the infrared reflecting film (9) is formed on the insulating film (2). In FIGS. 1 and 2, the wiring film portions and the infrared reflecting film (9) are illustrated by hatching.

The first wiring film (4A) and the infrared reflecting film (9) are formed in a shape to cover the interior of the frame of the terminal support body (5) in plan view. Specifically, as shown in FIGS. 1(a) and 1(c), the first wiring film (4A) of which the pairwise outer shape is set to have substantially the same square shape as that of the infrared reflecting film (9) and the infrared reflecting film (9) cover substantially the entirety of the interior of the frame of the top part of the terminal support body (5) as viewed (plan view) from the top of the insulating film (2).

Also, the pair of first wiring films (4A) is connected to a pair of first adhesion electrodes (5A) formed on the insulating film (2) on one end thereof and is connected to a pair of first terminal electrodes (8A) formed on the insulating film (2) on the other end thereof.

These first terminal electrodes (8A) and second terminal electrodes (8B) are adhered to the corresponding support convex parts (6a) via a conductive adhesive such as solder so as to be electrically conducted with each other.

Also, the pair of second wiring films (4B) is formed in the shape of a line or a band, is connected to a pair of second adhesion electrodes (5B) formed on the insulating film (2) on one end thereof, and is connected to a pair of second terminal electrodes (8B) formed on the insulating film (2) on the other end thereof.

Note that the terminal electrodes (3a) of the first heat sensitive element (3A) and the second heat sensitive element (3B) are adhered to the first adhesion electrodes (5A) and the second adhesion electrodes (5B), respectively, via a conductive adhesive such as solder.

The insulating film (2) is formed of a polyimide resin sheet. The infrared reflecting film (9), the first wiring film (4A), and the second wiring film (48) are formed by copper foil. Specifically, a double-sided flexible substrate is produced such that the infrared reflecting film (9), the first wiring film (4A), and the second wiring film (4B) are pattern-formed by copper foil on both sides of the polyimide substrate serving as the insulating film (2).

Furthermore, as shown in FIG. 1(a), the infrared reflecting film (9) is arranged in a square shape immediately above the second heat sensitive element (3B) and is constituted of a copper foil and a gold-plated film deposited on the copper foil.

The infrared reflecting film (9) is formed of a material having higher infrared reflectivity than that of the insulating film (2) and is constituted of a copper foil and a gold-plated film deposited on the copper foil as described above. Instead of the gold-plated film, a mirror finished aluminum vapor-deposited film, an aluminum foil, or the like may also be deposited on the copper foil. The infrared reflecting film (9) has a greater size than that of the second heat sensitive element (3B) so as to cover the second heat sensitive element (3).

As shown in FIG. 3, each of the first heat sensitive element (3A) and the second heat sensitive element (3B) is a chip thermistor in which the terminal electrodes (3a) are formed on both ends thereof. Examples of such a thermistor include an NTC type thermistor, a PTO type thermistor, a CTR type thermistor, and the like. In the present embodiment, an NTC type thermistor is employed as the first heat sensitive element (3A) and the second heat sensitive element (3B). The thermistor is formed of a thermistor material such as a Mn—Co—Cu-based material, a Mn—Co—Fe-based material, or the like.

In particular, in the present embodiment, a ceramic sintered body containing Mn, Co and Fe metal oxides, i.e., a thermistor element formed of a Mn—Co—Fe-based material is employed as the first heat sensitive element (3A) and the second heat sensitive element (3B). Furthermore, it is preferable that the ceramic sintered body has a crystal structure in which the main phase is a cubic spinel phase. In particular, it is most preferable that the ceramic sintered body has a crystal structure having a single phase consisting of a cubic spinel phase.

Next, a description will be given of an infrared sensor device (10) including the infrared sensor (1) of the present embodiment with reference to FIG. 5 and FIG. 6.

The infrared sensor device (10) includes a mounting substrate (12) having a plurality of substrate side wirings (14A) and (14B) patterned on the surface thereof; the infrared sensor (1) that is mounted on the surface of the mounting substrate (12) and to which the corresponding mounting terminals and substrate-side wirings are connected; a squarely cylindrical optical guide path member (16) that is disposed on the surface of the mounting substrate (12) so as to surround the infrared sensor (1) with the optical guide path member (16) opened immediately above the infrared sensor (1); and three lead wires (15) of which one ends are connected to the substrate-side wirings (14A) and (14B).

The mounting substrate (12) is a glass epoxy substrate, and a metal foil (12a) such as a copper foil is formed on the substantially entire back face of the mounting substrate (12). When the mounting substrate (12) is provided with a mounting aperture or the like or the connecting portions of the lead wires (15) are provided on the back face of the mounting substrate (12), the metal foil (12a) is formed on the entire back face of the mounting substrate (12) excluding these portions.

The lead wires (15) are connected to the ends of the substrate-side wirings (14A) and (14B) which are formed up to the end of the mounting substrate (12) via a conductive adhesive such as solder or the like.

The optical guide path member (16) is formed of a metal such as aluminum or a resin (e.g., highly heat resistant resin such as PPS).

The substrate-side wirings (14A) and (14E) have a pair of first substrate-side wirings (14A) connected to the pair of first wiring films (4A) and a pair of second substrate-side wirings (14B) connected to the pair of second wiring films (4B).

The pair of first substrate-side wirings (14A) and the pair of second substrate-side wirings (14) are set to have the same line width and thickness as each other, and the total length of the pair of first substrate-side wirings (14A) is set to be the sane as that of the pair of second substrate-side wirings (14B).

Figure 5:
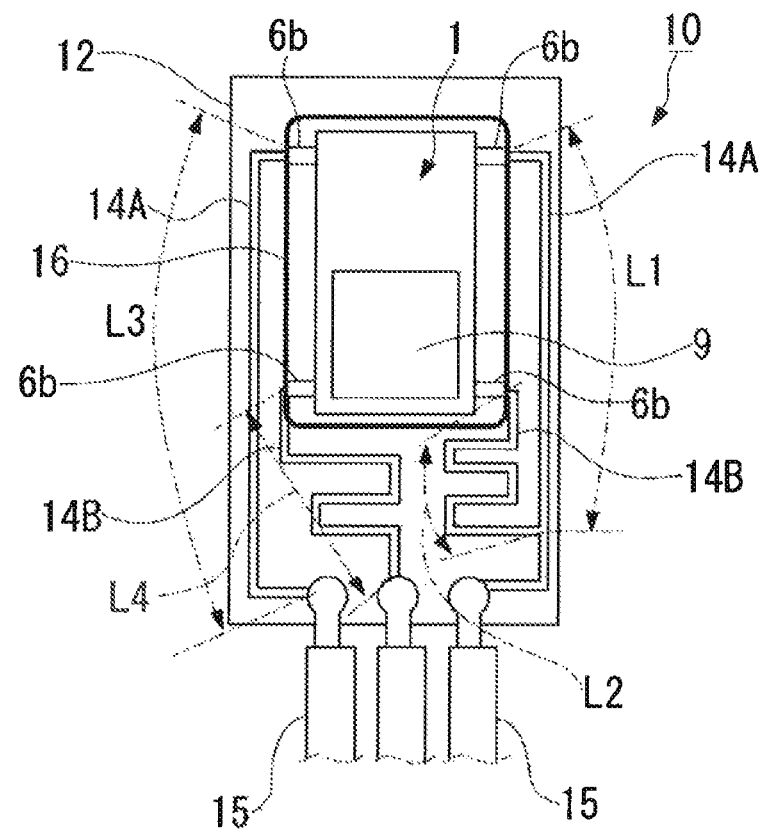
FIG. 5 is a plan view illustrating an infrared sensor device according to the present embodiment.
Figure 6:
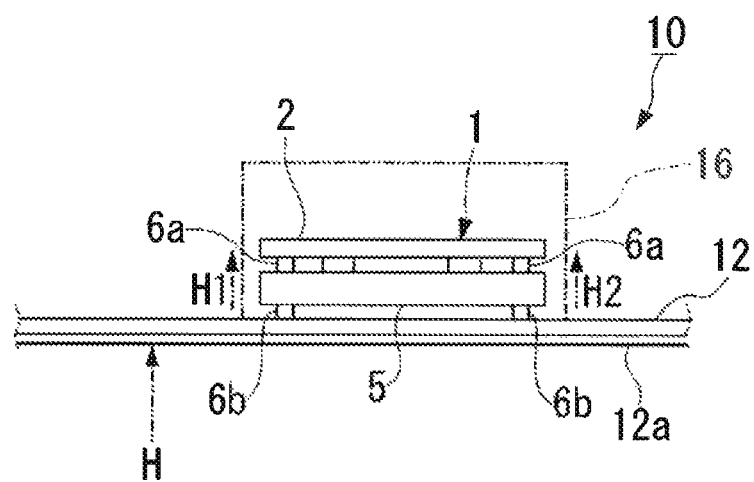
FIG. 6 is a front view illustrating the essential parts of the infrared sensor device of the present embodiment with the optical guide path member removed therefrom.

Specifically, as shown in FIG. 5, one of the pair of second substrate-side wirings (14B) and the other one of the pair of first substrate-side winos (14A) are bent and folded back into a meandering form to be set to be long such that the sum of the length L1 of one of the pair of first substrate-side wirings (14A) and the length L3 of the other one of the pair of first substrate-side wirings (14A) is the same as the sum of the length L2 of one of the pair of second substrate-side wirings (14B) and the length L4 of the other one of the pair of second substrate-side wirings (14B). For example, when the length 14 of the other one of the pair of second substrate-side wirings (14B) is short, leak of heat is increased, and thus, heat is accumulated in the first heat sensitive element (3A) side (heat-absorbing side), resulting in a change in the temperature distribution on the surface. In contrast, the length L3 is set to be the same as the length L4 and the length L1 is set to be the same as the length L2, so that heat can be uniformly dissipated from the respective wirings. Consequently, only the temperature distribution due to radiation heat remains on the surface.

Note that one of the pair of first substrate-side wirings (14A) and one of the pair of second substrate side wirings (14B) are common wirings connected to a base point and are connected to one of the lead wires (15). Thus, each of the length L1 of one of the pair of first substrate-side wirings (14A) and the length L2 of one of the pair of second substrate-side wirings (14B) is the length from the base point connected thereto.

As described above, since, in the infrared sensor (1) of the present embodiment, the support convex parts (6a) of the mounting terminals (6) are connected to the corresponding first wiring film (4A) and second wiring film (4B) and the insulating film (2) is supported such that a gap is provided between the terminal support body (5) and the insulating film (2), the insulating film (2) is supported by a plurality of mounting terminals (6) instead of the metal casing in the state floating from the mounting substrate (12) and the terminal support body (5).

The terminal support body (5) made of a resin functions as an insulator that supports a plurality of mounting terminals (6) and lifts the insulating film (2) up in the air apart from the mounting substrate (12). As described above, only the support convex parts (Sc) of the mounting terminals (6) are brought into contact with the insulating film (2), and the mounting terminals (6) have an electrical connecting function and an insulating film (2) supporting function, so that the infrared sensor (1) can be surface-mounted and the adverse effect of heat conduction from portions for fixing the insulating film (2) can be reduced as small as possible.

Since the terminal support body (5) is not directly brought into contact with the insulating film (2) and is made of a resin, the influence from the terminal support body (3) can be extremely minimised as compared with that of the conventional metal casing. Furthermore, electrical connection to the substrate-side wirings (14A) and (14B) on the mounting substrate (12) can be directly made by the mounting terminals (6) by surface mounting and the lead wires (15) are not brought into contact with the insulating film (2), so that heat dissipation and thermal imbalance caused by the lead wires (15) can be prevented.

Furthermore, since the lower portions (6b) of the mounting terminals (6) are provided so as to protrude below the bottom face of the terminal support body (5), the mounting substrate (12) is not directly brought into contact with the terminal support body (5) because of a space formed therebetween in the state where the mounting terminals (6) are surface-mounted on the mounting substrate (12), so that the influence of heat conduction from the mounting substrate (12) can also be suppressed. Thus, the insulating film (2) on which the heat sensitive elements (3A) and (3B) are provided, is floated, in two stages: a space formed between the insulating film (2) and the terminal support body (5) and the other space formed between the terminal support body (5) and the mounting substrate (12), resulting in an improvement in thermal insulation at the rear face (one face side) thereof.

Since the terminal support body (5) is formed in a frame shape along at least the outer edge of the insulating film (2), a major part of incident infrared radiation passes through the interior of the frame of the terminal support body (5) and thus is not absorbed by the terminal support body (5) even if a part of incident infrared radiation transmits through the insulating film (2), so that the change in temperature of the terminal support body (5) due to infrared radiation may be prevented.

Since the first wiring film (4A) is disposed around the first heat sensitive element (3A) and is formed to have a larger area than that of the second wiring film 46), the first wiring film (4A) having a large area blocks infrared radiation which is irradiated on the terminal support body (5) and the mounting substrate (12) by passing through the insulating film (2) and also blocks radiation heat radiated from the terminal support body (5) and the mounting substrate (12), so that the insulating film (2) may be prevented from being thermally affected. Furthermore, the first wiring film (4A) improves heat collection from a portion of the insulating film (2) at which infrared radiation has been absorbed and a heat capacity of the first wiring film (4A) becomes close to that of a portion in which the infrared reflecting film (9) is formed on the insulating film (2), resulting in a reduction in temperature variation error. Thus, the infrared sensor (1) sensitively reacts to ambient temperature fluctuation, and thus, exhibits excellent followability between a portion affected by radiation heat and a portion unaffected by radiation heat, resulting in a further improvement in detection accuracy.

Since, in the infrared sensor device (10) of the present embodiment, the infrared sensor (1) is mounted on the mounting substrate (12), the surface-mounted infrared sensor (1) can be integrally attached to the mounting substrate (12).

Since the metal foil (12a) is formed on the substantially entire back face of the mounting substrate (12), the heat H is dissipated by the metal foil (12a) even if the heat H is locally applied to the back face of the mounting substrate (12). Consequently, the heats H1 and H2 are uniformly transferred to both the first heat sensitive element (3A) side (heat-absorbing side) and the second heat sensitive element (3B) side (heat-reflecting side) as shown in FIG. 6. Thus, the temperature distribution on the mounting substrate (12) due to the local heat H is less likely to occur, so that only the temperature distribution due to radiation heat remains on the mounting substrate (12). Consequently, measurement error caused by the temperature distribution due to other than radiation heat can be suppressed.

Furthermore, since the pair of first substrate side wirings (14A) and the pair of second substrate-side wirings (14B) are set to have the same line width and thickness as each other, and the total length of the pair of first substrate-side wirings (14A) is set to be the same as that of the pair of second substrate-side wirings (14B), heat is uniformly dissipated from the substrate-side wirings (14A) and (14B), so that only the temperature distribution due to radiation heat remains on the surface. Thus, thermal imbalance caused by the substrate-side wirings (14A) and (14B) is suppressed, and heat is uniformly transferred to both the first heat sensitive element (3A) side (heat-absorbing side) and the second heat sensitive element (3B) side (heat-reflecting side), resulting in highly accurate temperature measurement.

Since the infrared sensor device (10) includes the cylindrical optical guide path member (16) that is disposed on the surface of the mounting substrate (12) so as to surround the infrared sensor (1) with the cylindrical optical guide path member (16) opened immediately above the infrared sensor (1), the optical guide path member (16) may not only serve as a windshield for the surface-mounted infrared sensor (1) but also serve to provide the directionality of received light.

The technical scope of the present invention is not limited to the aforementioned embodiments and Examples, but the present invention may be modified in various ways without departing from the scope or teaching of the present invention.

For example, while, in the above embodiments, the first heat sensitive element detects the heat conducted from the insulating film that has directly absorbed infrared radiation, an infrared absorbing film may also be formed on the insulating film, directly above the first heat sensitive element. In this case, the infrared absorption effect obtained by the first heat sensitive element further improves, so that a favorable temperature difference can be obtained between the first heat sensitive element and the second heat sensitive element. Specifically, infrared radiation from the object to be measured may be absorbed by the infrared absorbing film so that the temperature of the first heat sensitive element directly below the insulating film may be changed by heat conduction via the insulating film from the infrared absorbing film generated heat by infrared absorption.

The infrared absorbing film is formed of a material having a higher infrared absorptivity than that of the insulating film. As the infrared absorbing film, a film containing an infrared absorbing material such as carbon black or the like or an infrared absorbing glass film (borosilicate glass film containing 71% silicon dioxide) may be employed. In particular, it is preferable that the infrared absorbing film is an antimony-doped tin oxide (ATO) film. The ATO film exhibits excellent infrared absorptivity and excellent light resistance as compared with carbon black or the like. Also, the ATO film is cured by ultraviolet light so that strong bonding strength is obtained and the ATO film is not easily peeled off as compared with carbon black or the like.

It is preferable that the infrared, absorbing film is formed to have a larger area than that of the first heat sensitive element so as to cover the first heat sensitive element. When the infrared absorbing film is provided, the area and the shape of each of the wiring films need to be set such that the heat capacity of the infrared absorbing film is substantially the same as that of the infrared reflecting film.

While a chip thermistor is employed as each of the first heat sensitive element and the second heat sensitive element, a thin-film thermistor may also be employed as each of the first heat sensitive element and the second heat sensitive element.

As described above, although a thin-film thermistor or a chip thermistor is used as a heat sensitive element, a pyroelectric element or the like may also be employed other than a thermistor.

REFERENCE NUMERALS

1: infrared sensor, 2: insulating film, 3A: first heat sensitive element, 3B: second heat sensitive element, 4A: first wiring film, 4B: second wiring film, terminal support body, 6: mounting terminal, 6a: support convex part, 9: infrared reflecting film, 10: infrared sensor device, 12: mounting substrate, 12a: metal foil, 14A: first substrate-side wiring, 14B: second substrate-side wiring, 16: optical guide path member

What is claimed is:

1. An infrared sensor device comprising:
   a mounting substrate having a plurality of substrate-side wirings patterned on the surface thereof; and
   an infrared sensor having a plurality of mounting terminals and that is mounted on the surface of the mounting substrate and to which the corresponding mounting terminals and substrate-side wirings are connected;
   wherein the infrared sensor comprises:
   an insulating film;
   a first heat sensitive element and a second heat sensitive element provided on one face of the insulating film so as to be spaced apart from one another;
   a first conductive wiring film and a second conductive wiring film that are formed on said one face of the insulating film and are respectively connected to the first heat sensitive element and the second heat sensitive element;
   an infrared reflecting film provided on the other face of the insulating film so as to face the second heat sensitive element; and
   a terminal support body having a through hole under the insulating film, made of a resin, arranged on the one face,
   wherein the mounting terminals are built into the terminal support body, and the lower portions of the mounting terminals are disposed on the lower portion of the terminal support body,
   wherein the mounting terminals extend to an upper surface of the terminal support body opposite to the insulating film and have support convex parts protruding from the upper surface to the insulating film, and the support convex parts are connected to the corresponding first and second wiring films and support the insulating film such that a first gap is provided between the terminal support body and the insulating film,
   wherein the lower portions of the mounting terminals protrude downward from a bottom surface of the terminal support body,
   wherein the infrared sensor is mounted on the surface of the mounting substrate such that a second gap is provided between the terminal support body and the mounting substrate, and
   wherein the first gap communicates with the second gap through the through hole.

2. The infrared sensor device according to claim 1, wherein the lower portions of the mounting terminals are provided so as to protrude below the bottom face of the terminal support body.

3. The infrared sensor device according to claim 2, wherein the first wiring film is disposed around the first heat sensitive element and is formed to have a larger area than that of the second wiring film.

4. The infrared sensor device according to claim 1, wherein the terminal support body is formed in a frame shape along at least the outer edge of the insulating film.

5. The infrared sensor device according to claim 4,
wherein the first wiring film is disposed around the first heat sensitive element and is formed to have a larger area than that of the second wiring film.

6. The infrared sensor device according to claim 1, wherein the first wiring film is disposed around the first heat sensitive element and is formed to have a larger area than that of the second wiring film.

7. The infrared sensor device according to claim 1, wherein a metal foil is formed on the substantially entire back face of the mounting substrate.

8. The infrared sensor device according to claim 1, wherein the substrate-side wirings have a pair of first substrate-side wirings connected to the first wiring films and a pair of second substrate-side wirings connected to the second wiring films, the pair of first substrate-side wirings and the pair of second substrate-side wirings are set to have the same line width and thickness as each other, and the total length of the pair of first substrate-side wirings is set to be the same as that of the pair of second substrate-side wirings.

9. The infrared sensor device according to claim 1, further comprising:
a cylindrical optical guide path member that is disposed on the surface of the mounting substrate so as to surround the infrared sensor with the cylindrical optical guide path member opened immediately above the infrared sensor.

\* \* \* \* \*